Sept. 11, 1928.
L. B. STERLING
MOTOR HEATER
Filed May 31, 1924
1,684,157
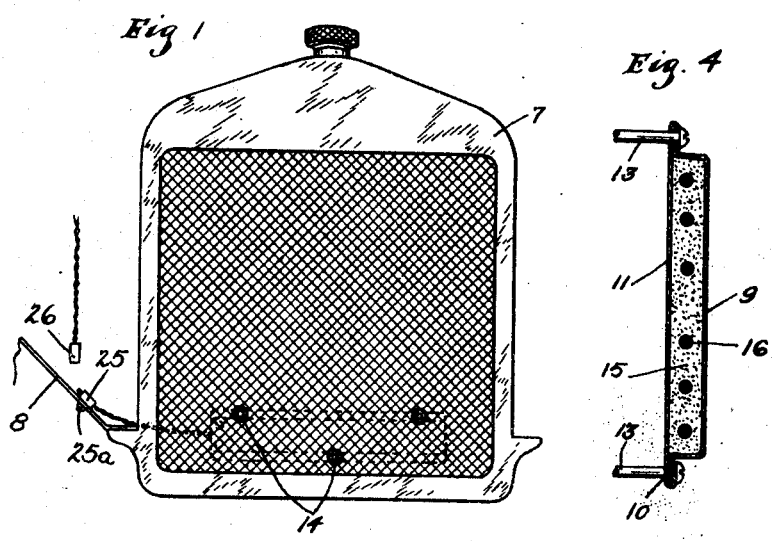
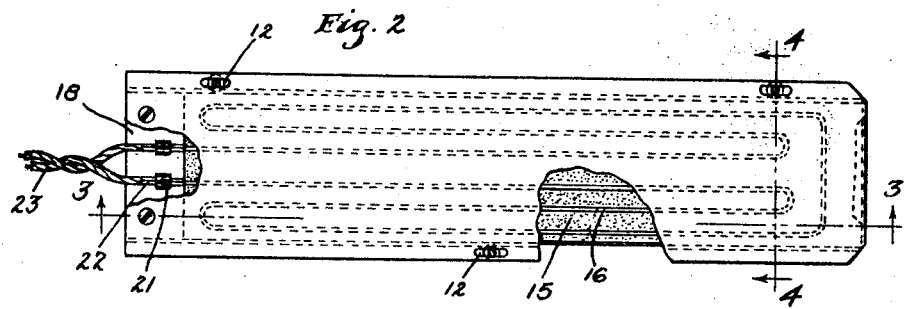
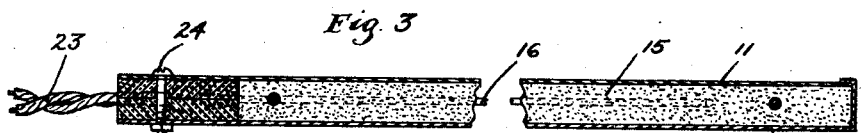
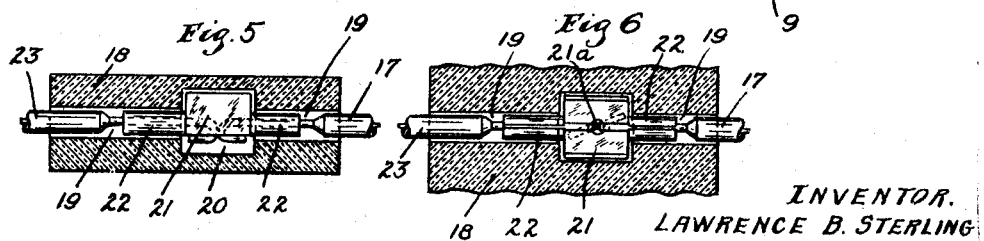
INVENTOR.
LAWRENCE B. STERLING
BY HIS ATTORNEY.
James F. Williamson Patented Sept. 11, 1928.

1,684,157

UNITED STATES PATENT OFFICE.

LAURENCE B. STERLING, OF MINNEAPOLIS, MINNESOTA, ASSIGNOR TO GEORGE H. STERLING, OF MINNEAPOLIS, MINNESOTA.

MOTOR HEATER.

Application filed May 31, 1924. Serial No. 716,954.

This invention relates to small compact electric heaters and especially to devices adapted for heating automobile radiators and motors, and consequently preventing the freezing of the same during cold weather.

It is an object of this invention to provide a highly efficient motor heater to be secured to and carried by the radiator of the automobile which may be readily connected with the ordinary household source of electric energy when the automobile is standing in the garage, or with a source of electricity carried by the automobile.

A more specific object of this invention is to provide in such a device a heating unit and connection members therefor of such construction that there will be no danger of the same becoming displaced or disconnected due to the persistent jolting and jarring of the automobile in driving.

These and other objects of the invention will be apparent from the description made in connection with the drawings wherein like notations refer to similar parts thruout the several views, and in which, Fig. 1 is a front elevation of an automobile radiator with the heating device attached to the back side thereof;

Fig. 2 is an enlarged rear view of the heater with some parts broken away;

Fig. 3 is a fragmentary horizontal section taken on the line 3—3 of Fig. 2;

Fig. 4 is a vertical section on an enlarged scale taken on the line 4—4 of Fig. 2, and;

Figs. 5 and 6 are enlarged detail sectional views illustrating the novel connection members and insulators therefor.

An automobile radiator of standard type is indicated by the numeral 7 at the side of which a portion of a fender 8 is shown. The numeral 9 designates a rectangular trough shaped casing of U-shaped cross section, having the flanges 10 along its longitudinal sides and preferably pressed from sheet metal. A cover 11 is provided for said casing formed from a rectangular sheet of metal of slightly larger width than the casing 9. The longitudinal edges of this cover are bent over the flanges 10 of the casing to secure the same thereto. Slots 12 are provided in the flanges 10, and the bent edges of the cover 11, thru which headed bolts may pass. The bolts 13 are adapted to extend thru the corrugated portion of the radiator 7 and have their outer ends engaged by burrs 14. The slots 12 permit the bolts to be adjusted to correspond with proper apertures in the radiator front.

The heating unit is snugly disposed within and cemented to the casing 9 and comprises a rectangular pad 15 of dielectric hardened material, capable of conducting heat, such as a cement mixture, having embedded in the middle thereof the heating element 16, which is preferably in the form of a wire bent into elongated parallel spaced convolutions, having terminals 17 extending beyond one of the lateral edges of the pad 15. The heating unit occupies all of the space within the casing 9, except a narrow portion at one end thereof, in which a rectangular shaped split insulator 18 is disposed adjacent to the terminal end of the heating unit. Insulator 18 has within substantially parallel to the longitudinal edges of the casing 9, a pair of grooved passage ways 19, leading from each side thereof into enlarged central recesses 20. These passage ways and recesses are adapted to contain novel connection members, having enlarged angular portions 21, and relatively small cylindrical clamping portions 22, at either side thereof as shown in Figs. 5 and 6. The central portions 21 are seated in the large central recesses 20, and the clamping portions are adapted to engage the terminals 17 of the heating unit on one side of the insulator, and the ends of a pair of feed wires 23 on the opposite side thereof. The extremities of said terminals and feed wires are inserted thru small holes 21A in the bottom surface of the central portions 21 of the connection members, and bent back against the bottoms thereof to more firmly secure said elements to the connection members. The feed wires 23 extend beneath one side of the hood to the outside of the automobile and are connected to a terminal plug 25 mounted preferably on the apron of one of the front fenders 8. The terminal plug 25 preferably is equipped with a small bolt 25ª adapted to pass thru a hole in the fender and engage a small nut on the opposite side. A socket 26, connected to a source of electricity is adapted to engage the terminal plug 25 when it is desired to use the heater.

From the above description, it is apparent that when an automobile equipped with the novel heating device is driven into an unheated garage, the heater may be readily connected with the ordinary service electrical connection, and freezing of the radiator will, consequently, be prevented during the coldest weather. The amount of electricity necessary is exceedingly small. If it is desired to heat the motor and radiator while the automobile is in use, the terminal 25, may, of course, be connected to a source of electricity carried by the automobile. An extensive actual usage of the heater has proven it to be very successful for the purposes enumerated.

In the process of making the heating unit above described, a suitable flexible wire is first laid out on a flat surface in the parallel spaced convolutions as illustrated in Fig. 2. The top of the heating element is then covered with a substantial layer of plastic dielectric material adapted to harden, preferably a mixture of Portland cement and asbestos in the form of paste. This may be poured on, or preferably coated on with a brush. The bottom of the trough shaped casing 9 is then covered with a substantial coating of the cement paste, and the step product including the heating element is then disposed in the casing and pressed downwardly against the layer of material at the bottom thereof. The terminals 17 of the heating element are left to project beyond one end of the pad formed. The cement is then permitted to harden, which is done preferably by baking the dielectric material in an oven. The finished heating unit is then in the form of a hardened pad cemented to the bottom of the casing 9, and having embedded in its core the heating element 16. Thus the several convolutions in the heating element 16 are completely insulated from each other and from the sides of the casing, and embedded within the cement pad 15. The greatest jarring and jolting of the automobile, cannot, therefore, injure the heating element to the slightest degree. The pad moreover is cemented firmly to the bottom of the casing and cannot shake around in the casing when the automobile is driven.

The novel connection members firmly secure the terminals of the heating element 17 to the ends of the feed wires 23 and the seated structure of the enlarged portions 21, preventing longitudinal movement of the wires within the insulator 18. There is, therefore, no chance of the wires becoming loosened or short circuited under the strain and jolting of driving.

It is therefore seen that applicant's novel heater is especially adapted for rough usage and especially for disposition on the radiator of an automobile.

It is, of course, understood that various changes may be made in the form, details and arrangement of the parts without departing from the scope of the invention, and also that the invention is by no means to be limited in its application to an automobile heating device, but is capable of all general heating usage.

What is claimed is:

An electric heater for automobile motors comprising a relatively shallow trough-like casing having upturned longitudinal edges and an upturned lateral edge at one end thereof, a pad of dielectric material cemented to the bottom of said casing fitting snugly within said upturned sides, a heating element embedded within said pad and forming a core thereof, a block of insulating material disposed within said casing at the end opposite said upturned end, terminals carried by said block and a cover of sheet material enclosing said pad and block.

In testimony whereof I affix my signature.

LAURENCE B. STERLING.